United States Patent
Baer et al.

[15] 3,685,622
[45] Aug. 22, 1972

[54] COMPRESSOR CLUTCH

[72] Inventors: John S. Baer, Medford Lakes; John H. Weatherby, Sewell, both of N.J.

[73] Assignee: Precision Specialties, Inc., Pitman, N.J.

[22] Filed: June 15, 1970

[21] Appl. No.: 46,108

[52] U.S. Cl. ................... 192/35, 192/48.3, 192/79, 192/81 C
[51] Int. Cl. .......................................... F16d 13/04
[58] Field of Search....192/35, 48.3, 81, 81 C, 107 T, 192/79; 64/15 R, 15 C

[56] References Cited

UNITED STATES PATENTS

| | | | |
|---|---|---|---|
| 441,254 | 11/1890 | Pfouts | 192/107 T |
| 2,566,539 | 9/1951 | Starkey | 192/81 |
| 3,149,706 | 9/1964 | Mason et al. | 192/35 |
| 3,177,996 | 4/1965 | Bates | 192/81 |

FOREIGN PATENTS OR APPLICATIONS

| | | | |
|---|---|---|---|
| 898,183 | 6/1962 | Great Britain | 192/81 R |

Primary Examiner—Benjamin W. Wyche
Assistant Examiner—Randall Heald
Attorney—Wolfe, Hubbard, Leydig, Voit & Osann

[57] ABSTRACT

Rotatable input and output hubs each have opposed friction faces separated by a bearing means through which at least a substantial torque is transmitted. A helical spring is attached to the output hub and surrounds a portion of the input and output hubs, but is normally out of engagement with the input hub. A pressure ring also surrounds portions of the input and output hubs and in turn is surrounded by the helical spring. The pressure ring is composed of at least three segments, each having a pair of beveled faces directed toward one another and opposing oppositely beveled faces on the input and output hubs, respectively. The free end of helical clutch spring is preferably magnetically selectively drawn into contact with the driven input hub by an energizing magnetic field which in turn causes the spring to wrap down and exert radially inward pressure on the pressure ring. The input hub includes a portion of a magnetic circuit including an air gap into which the last turn of the helical spring is drawn as the magnetic field is energized.

8 Claims, 7 Drawing Figures

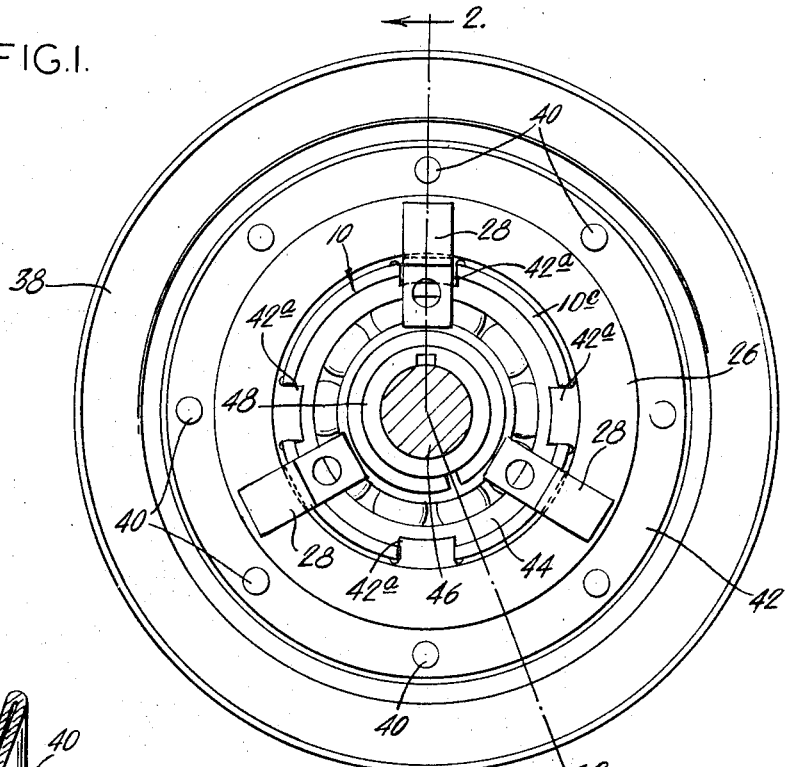
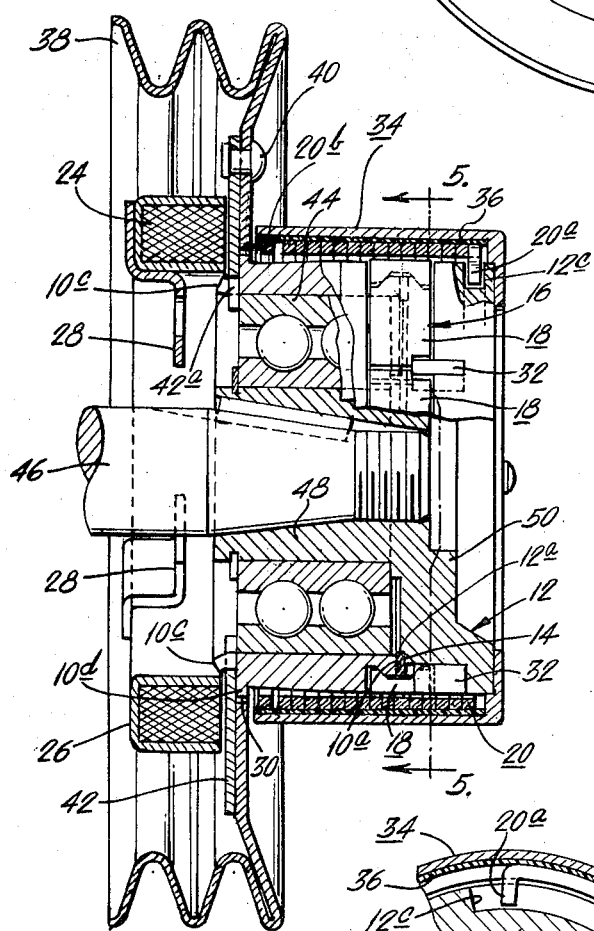
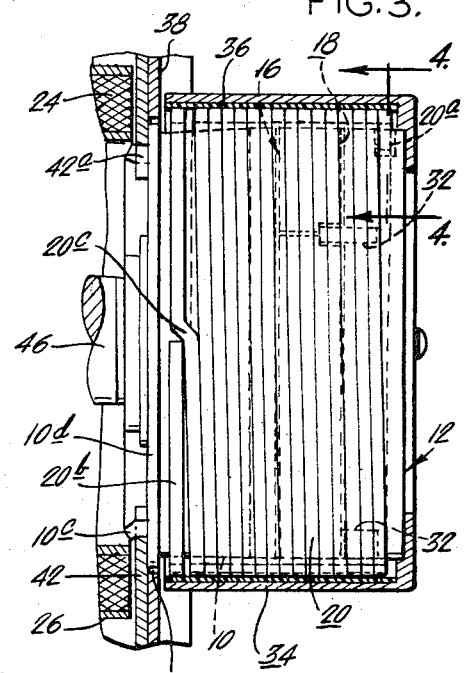
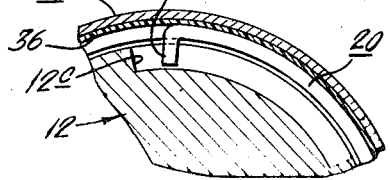
PATENTED AUG 22 1972  3,685,622  SHEET 1 OF 2
FIG. 1.
FIG. 2.
FIG. 3.
FIG. 4.
INVENTORS:
JOHN S. BAER
JOHN H. WEATHERBY
BY Howson & Howson
ATTYS

COMPRESSOR CLUTCH

The present invention relates to a novel friction clutch which is actuated by a helical spring, which may also provide a helical spring clutch effect. The present invention also concerns a novel means of magnetically actuating the helical spring and some related mechanical features.

In the prior art, helical clutch springs have been developed which have capabilities of handling extremely large loads. The nature of the spring clutches is such that the size of the load is usually not a major factor limiting its use. How-ever, a helical spring clutch depends upon a continuing positive torque load in order to be effective. In application where the load is not always positive and a negative torque is transmitted at some time helical spring clutches lose their effectiveness. For example, in applications where an alteration of positive and negative torques may be experienced is not a suitable application for a helical spring clutch. The tendency is for a helical spring clutch to be immediately responsive to load conditions so that even the momentary experience of a negative load may cause such a clutch to slip.

The present invention also relates to a novel clutch structure which has many of the operating advantages of a helical spring clutch and yet is able to accomodate to loads wherein momentary negative torques may occur. Friction clutches have been known to be able to accept such torque conditions and accordingly the present clutch employs a friction clutch in the form of clutch surfaces across which torque, which may include momentary negative torques, are transmitted without adverse effect on the clutch.

In accordance with the present invention, a friction clutch is provided, comprising rotatable input and output hubs, each having opposed clutch faces. A pressure ring composed of at least three segments encloses portions of the input and output hubs. A helical spring normally out of engagement, but surrounding the pressure ring, has one end attached to one of the hubs. Means is provided to selectively act on the other end of the helical spring to cause the spring to wrap down on the pressure ring.

The present invention also relates to a novel magnetic actuator whereby a helical spring may be actuated by effectively pulling part of the spring as an armature against a magnetized relatively rotating hub so that it is effectively attached to that structure, but not so positively attached that it is incapable of slipping before breakage occurs. Preferably the spring is attached to one of two hubs in relative rotation and when attracted to the other is subjected to the relative rotation causing it to wrap down on the two hubs. Release of the magnetic field releases the clutch spring.

More specifically, the present invention relates to a helical spring device having input and output hubs rotatable relative to a reference frame about a common axis. A normally disengaged helical spring of magnetic material is attached to one of the hubs and surrounds but is normally out of contact with the other. A selectively actuatable magnetic field generating means is positioned to energize a magnetic circuit including a portion of the hub to which one end of the spring is not affixed and in position to attract the spring to the thus selectively magnetized hub, which causes the spring to be wrapped down onto the hub it surrounds. In wrapping down the spring may actuate a pressure ring or simply act as a clutch element engaging a clutch.

In particular, the present invention relates to a friction clutch including a tubular housing which is attached to one of the hubs to constrain the spring in a position spaced from the hubs by preventing the spring from attaining a relaxed diameter when the clutch is disengaged so as to keep the spring more stable and help maintain its shape.

Other novel features besides those described above are part of the present invention. Such novel features will be described in connection with a specific embodiment described herein, and shown in the drawings in which FIG. 1 is an end elevational view of the clutch;

FIG. 2 is a sectional view of the clutch taken along line 2—2 but partially shown in elevation to show more clearly some of the details of the structure;

FIG. 3 is a partial view of a portion of FIG. 2 showing more of the structure, including the helical spring, in elevation;

FIG. 4 is a partial sectional view taken along line 4—4 of FIG. 3;

Figure 5:
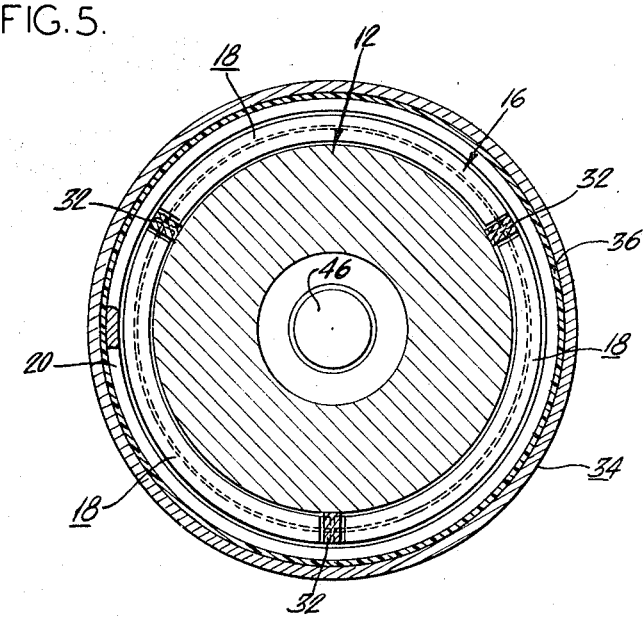
FIG. 5 is a sectional view taken along line 5—5 of FIG. 2.
Figure 6:
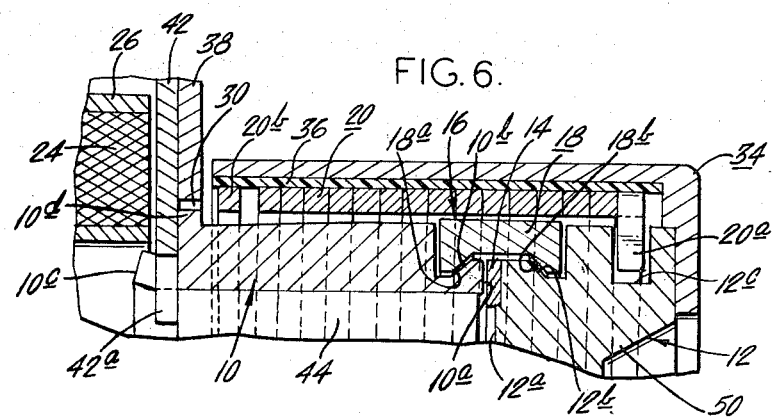
FIG. 6 is an enlarged detailed sectional view similar to part of FIG. 2, showing a clutch in disengaged condition.
Figure 7:
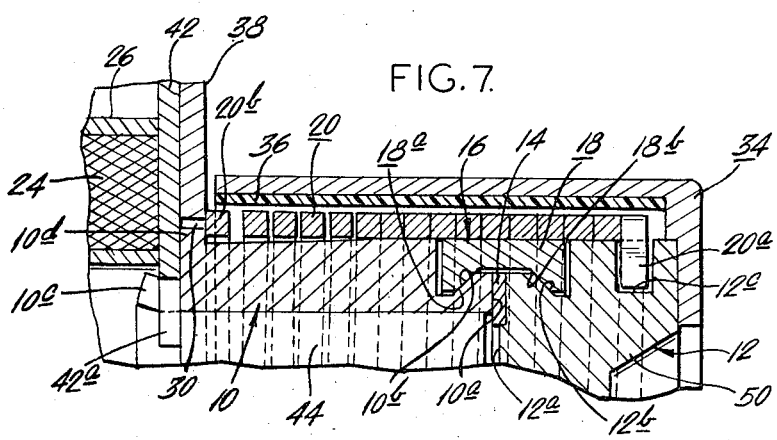
FIG. 7 is a view similar to FIG. 6 on the same scale, showing the clutch engaged.

Referring to the drawings, and particularly to FIG. 2, the clutch shown employs an input hub generally designated 10 and an output hub generally designated 12, both of which are rotatable about a common axis. These hubs have opposed friction clutch faces 10a and 12a, separated by a bearing ring 14 of sintered bronze, or other suitable material, acting to promote free relative rotation of the faces when they are not engaged. The structure also has a pressure ring, generally designated 16, composed in this case of three identical segments 18, as best seen in FIG. 5. Each of the segments has a pair of beveled faces 18a and 18b (see FIGS. 6 and 7) which are directed toward one another. Beveled face 18a opposes an oppositely beveled face 10b on input hub 10, and beveled face 18b opposes an oppositely beveled face 12b on output hub 12. As seen in FIGS. 6 and 7, radially inwardly directed pressure on the outer surface of the segments 18 of pressure ring 16 will move the segments radially inwardly to cause face 18a to bear against face 10b and face 18b to bear against face 12b.

The preferred means of accomplishing clutch engagement in this manner is a helical spring 20 which is attached by tang 20a to output hub 12. For reasons explained below the tang 20a is received in a slot 12c, which is elongated and preferably extends over 90°. The other end of the spring terminates in a flat final turn 20b, as seen in FIG. 3, in order to provide a planar almost continuous ring of magnetic material. The planar final turn may be formed by putting a bend 20c in the spring to deform the last turn from a helix into a circular turn, as shown in FIG. 3.

The magnetic system, generally designated 22, acting upon the turn 20b consists of a toroidal winding 24 in a toroidal trough, or U-shaped magnetic housing 26 providing part of the magnetic circuit but open on a radial sidewall. The winding 24 and housing 26 are not supported on the rotating structure, but housing 26 has three similar radially inwardly extending brackets 28, which enable it to be mounted to a ring (not shown) connected to the stationary frame.

The input hub is composed mostly of magnetic material and has a planar radially outwardly extending wall of magnetic material between the last turn 20b of the helical spring 20 and the magnetic winding 24, which wall completes the flux path of housing 26. The wall includes, however, a small reluctance gap 30 which is preferably annular in shape and spaced directly opposite and at the radius of the last turn 20b. When the winding 24 is energized the magnetic field created in the magnetic circuit and across the gap tends to draw the last turn 20b of the helical spring into the gap as an armature. As a practical matter, the last turn is drawn into the iron of the input hub on each side of the gap, as best seen in FIG. 7. Therefore, the last turn of the input hub when drawn magnetically into this position tends to be turned with the input hub. Such turning causes the input hub to exert a force on the helical spring 20 back to tang 20a, causing it to wrap down, as shown in FIG. 7, after the tang reaches the end of the slot 12c, shown in FIG. 4.

It will be observed that in the actuation of the clutch, the clutch spring also wraps down on the cylindrical surfaces of the input hubs and, to this extent, acts also as a helical drive clutch. Clutches having friction faces have particular value as force transmission means in applications where loads are uneven and shifting and the clutch may even experience negative forces. Thus, for example, in the typical application shown of the clutch to automobile air conditioners, the compressor is attached to the output and the fan belt to the input. It may readily occur in such a system that the compressor will momentarily override the input and generate negative forces. A helical spring clutch would be unable to cope with this type of situation since each time negative torque was applied it would tend to release the clutch. However, in the illustrated type of structure, all of the negative coupling thrust is on the washer 14; that is, it is accepted by the friction clutch faces 10a and 12a and the friction clutch faces are capable of transmitting this negative force if the negative effect is not sustained.

It should be noted in passing that the segments 18 of the pressure ring are preferably formed of hardened sintered steel, as are the input and output hubs and their beveled faces on the hubs opposing beveled faces on the segments, as shown in FIG. 6. The outer surface of the pressure ring is just above the adjacent cylindrical hub surfaces, and, in driving condition, it is moved until the outer surface of the segments are almost flush with the drive surfaces on the hubs in maximum drive position. As a compromise, in practice, the outer surface of the pressure ring is normally just barely above the hubs, and preferably imperceptibly so, so that the spring 20 will experience no bridging action. It should also be observed that the segments 18 are free-floating and in order to hold them in their relative positions around the circumference of the hubs, keys 32 in the output hubs engage the segments as seen in FIGS. 2 and 5, in order to keep the segments from shifting laterally.

The keys, of course, must not rigidly hold the segments in place in order to permit the segments to move as needed to act appropriately. Therefore, the segments stay with the output hub so that when the output hub is stationary, and the input hub is rotating, the segments will be stationary. It might also be mentioned in passing that additional shorter arcs of segments can be used in order embodiments and up to five have been employed in various embodiments.

In connection with the tendency of the output to override the input, is the slot 12c. This slot is provided so that the tang 20a can ride back and forth in the slot as pulsating negative torque effects are experienced and there will not be a tendency to sheer off the tang which might exist were the tang being rigidly held in place.

Another novel structural feature is spring housing 34, which tends to constrain the spring in position by preventing the spring from attaining its maximum relaxed diameter. A lining of resilient material 36 inside the housing acts as a cushion for the spring and prevents a bell (ringing) effect as the spring is released and snaps against the housing. A spring retained within the housing is more stable and tends to maintain its shape better than it would were it completely relaxed.

It will be observed that the particular embodiment of the clutch illustrated is intended for applications such as automobile air conditioner compressor connection. In order to provide a magnetic reluctance gap, it was convenient to provide an integral novel sheetmetal pulley 38, which is radially aligned with a short flange on the input hub. An intermediate non-magnetic ring 42 is first fixed to the hub itself and then by rivets 40 the ring is attached to the pulley web. As best seen in FIG. 1, the inner diameter of the ring 42 is provided with radially inwardly extending tongues or projections 42a which serve the function of preserving alignment. The input hub itself is designed to have a tubular extension 10c of generally smaller diameter than the inner diameter of the ring 34 over which the ring fits, which tubular extension is interrupted to pass the tongues 42a. A slight swaging of this tubular extension 10c, as seen in FIG. 2 will suffice to hold the ring 42 in place. It will be noted that the tongues 42a tend to act as stops to hold the outer race of ball bearings 44 in place.

It will also be observed that the input hub tapers to a smaller diameter adjacent the pulley web with a slight shoulder provided, giving a very short radially outwardly projecting flange 10d preferably of the thickness of the metal web integral with the pulley. The radial spacing of the outer edge of this flange from the pulley web provides the annular air gap 30 previously described in connection with the magnetic circuit of which the flange 10d and the pulley web form a part.

Another interesting structural feature of the compressor clutch structure shown is the ball bearing support of the input hub 10 on the output hub 12. The nature of the output hub 12 is such that it is to be connected directly to the compressor shaft 46. Therefore the output hub 12 is provided with a shaft receiving socket or reentrant portion 48, whose outer diameter supports the inner race of ball bearing 44. The outer race of ball bearing 44, as previously described, supports the input hub 10, which is little more than a heavy cylindrical sleeve. In order to provide an effective output hub having the same outer diameter as the input hub 10, the output hub structure 12 extends outwardly from the socket 48 adjacent the input hub and its outward extending portion also provides a shoulder stop for the inner race of the bearing 44. Preferably the shoulder stop is recessed away from the bearing races generally to give adequate clearance to insure operation of the bearing without interference. However, the massive radially extending flange 50 whose outer surface provides the output hub constitutes a rather material departure from conventional helical spring clutch construction. This construction, however, is particularly adapted for an air conditioner or compressor clutch structures to accomodate the clutch in little more space than it would take to mount a pulley alone on the shaft.

It will be observed that the input and output hubs are held together by the pressure ring, which, even in its relaxed position provides a bracket limiting lateral movement of the input hub relative to the output hub.

The operation of the compressor clutch may be summarized as follows: the compressor is not driven when the clutch is not engaged and the fan belt over the input pulley 38 causes the input hub 10 to rotate freely relative to the output because of the ball bearing 44 and bearing ring 14. When the clutch is to be engaged and the compressor rendered effective, the winding 24 is energized causing magnetic flux at gap 30 to draw the last turn 20b of the helical spring 20 into that gap so that the last turn of the spring then tends to rotate with the input hub. Rotation is in a counter-clockwise direction, as viewed in FIG. 1, and consequently the right-hand spring 20 tends to be wrapped down on the input hub 10 and output hub 12, as well as on pressure ring 16. The pressure ring is slightly above the surface of the two hubs and is forced radially inwardly whereby the hubs are urged together by the pressure ring's segment's opposed beveled surfaces acting upon the appropriate beveled surfaces of the hubs. Negative torque is experienced as the compressor tends to override the drive from time to time. However, since the tang 20a of spring 20 rides in a slot 12c these variations in torque, even though severe at times, do not tend to sheer off a tang, but cause it to modify its position in the slot in response to a transient torque effect.

A particular embodiment of the present invention has been described. While it is a preferred embodiment, it is by no means the only possible structure embodying the present invention. The present invention involve several novel structural aspects which need not all be used together and it is contemplated that some may be used without others, in certain applications. Furthermore, the specific embodiments of the structure shown may be modified considerably. All such modifications within the scope of the claims are intended to be within the scope and spirit of the invention.

We claim:

1. A friction clutch comprising
    a rotatable input hub having a clutch surface,
    a rotatable output hub having a clutch surface, a pressure ring composed of at least three segments and enclosing portions of the input and output hubs, said pressure ring segments having a pair of beveled faces directed toward one another and each opposing an oppositely beveled face on different ones of said input and output hubs whereby pressure on outer surfaces of the pressure ring segments will urge said ring segments into torque transmitting engagement with said clutch surfaces with forces directed generally towards each other,
    a helical spring surrounding but normally out of engagement with the pressure ring and having one end attached to one of the hubs, and
    means selectively acting on the other end of the helical spring to cause said spring to wrap down on the pressure ring, thereby exerting pressure on the outer surfaces of the pressure ring segments to urge said ring segments and the clutch surfaces into engagement.

2. The friction clutch of claim 1 in which a key is provided for each of the pressure ring segments in one of the hubs in order to hold the position of the segments relative to that hub.

3. The friction clutch of claim 2 in which the keys provided are located between the ends of the segments.

4. The friction clutch of claim 3 in which the keys are fixed in the output hub.

5. In a helical spring device
    a reference frame,
    an input hub rotatable relative to the reference frame,
    an output hub rotatable relative to said reference frame,
    a helical spring of magnetic material engageable with at least one of said hubs but normally out of contact therewith and having one end connected with the other hub,
    magnetic drag means, including a selectively actuatable magnetic field generating means and a magnetic circuit positioned to be energized thereby, and to include as an armature that end of said helical spring which is not connected with said other hub and effective to attract said spring to the thus selectively magnetized hub, thereby imposing a drag on the spring due to relative motions of said other hub to cause the spring to engage the at least one hub with which it is engageable, and
    a rigid tubular cover with a lining of sound dampening material placed around the hubs and supported from one of the hubs in a position to contain and support the spring device and prevent its ever expanding to a fully unstressed condition when the clutch is disengaging.

6. The helical spring device of claim 5 in which the tubular cover has a lining of resilient material providing a sound dampening effect.

7. In a helical spring device
    a reference frame,
    an input hub rotatable relative to the reference frame,
    an output hub rotatable relative to the reference frame, and
    a helical spring connected at one end to one of said hubs and displaceable relative thereto at its other end in order to effectively change the spring diameter to engage the other hub, said means of connection including a spring tang engagable in a slot in the hub to which said one end of such spring is attached permitting a limited amount of relative rotation between the tang and the hub, said tang slot extending for an arc of on the order of 90° around the circumference of the hub.

8. A friction clutch comprising input and output hubs disposed end to end and relatively rotatable about a common axis, a helical spring concentric with said axis, telescoped with said hubs and having one end free and a tang on the other end, means actuatable to engage the clutch and thereby hold the free end of said spring for rotation in one direction with one hub, second means holding said tang against movement in said one direction relative to the other hub so that when said first means is actuated said spring flexes to engage with said hubs to hold said hubs for rotation together about said axis, said second means including an elongated arcuate slot formed in said other hub and loosely receiving said tang so that the tang engages one end of the slot and is blocked thereby against movement in said one direction relative to said other hub when said first means is actuated, said tang floating in the opposite direction in said slot when said first means is deactuated to disengage the clutch thereby freeing both ends of the spring so that the spring can flex away from engagement with said hubs, a tubular housing supported on one of said hubs concentric with said axis, and including a wall surface spaced radially from said hubs with said spring being telescoped into the space between the wall surface and the hubs for flexing from contact with said hubs to a position in which said housing constrains said spring against attaining a relaxed diameter and keeps the tang within said slot when said first means is deactuated, and a lining of resilient material disposed between said spring and said wall surface to cushion the spring as the later flexes into said position.

* * * * *